United States Patent
Chatelier et al.

(12) 
(10) Patent No.: US 6,916,422 B2
(45) Date of Patent: Jul. 12, 2005

(54) SELF-ADAPTIVE METHOD FOR REGULATING AN EFFLUENT TREATING PLANT, IN PARTICULAR FOR WASTE WATER

(75) Inventors: Patrice Chatelier, Paris (FR); Gilles Carrand, Sartrouville (FR); Jean-Marc Audic, Conflans Sainte Honorine (FR)

(73) Assignee: Ondeo Services, Nanterre (FR)

( * ) Notice: Subject to any disclaimer, the term of this patent is extended or adjusted under 35 U.S.C. 154(b) by 0 days.

(21) Appl. No.: 10/467,674

(22) PCT Filed: Feb. 5, 2002

(86) PCT No.: PCT/FR02/00448

§ 371 (c)(1),
(2), (4) Date: Jan. 6, 2004

(87) PCT Pub. No.: WO02/064514

PCT Pub. Date: Aug. 22, 2002

(65) Prior Publication Data

US 2004/0089614 A1 May 13, 2004

(30) Foreign Application Priority Data

Feb. 12, 2001 (FR) .............................................. 01 01878

(51) Int. Cl.$^7$ ................................................. C02F 3/00
(52) U.S. Cl. ....................... 210/620; 210/623; 210/626; 210/739; 210/800; 210/723
(58) Field of Search ................................. 210/620, 739, 210/800, 723, 623, 626

(56) References Cited

U.S. PATENT DOCUMENTS

| | | | |
|---|---|---|---|
| 4,783,750 A | 11/1988 | Smith | |
| 5,589,068 A | 12/1996 | Nielsen | |
| 6,309,548 B1 | 10/2001 | Chatellier et al. | |
| 6,312,600 B1 | 11/2001 | Audic et al. | |

FOREIGN PATENT DOCUMENTS

| | | |
|---|---|---|
| FR | 2765210 | 12/1998 |
| FR | 2769305 | 4/1999 |

*Primary Examiner*—Chester T. Barry
(74) *Attorney, Agent, or Firm*—Connolly Bove Lodge & Hutz LLP

(57) ABSTRACT

The invention concerns a method for regulating a wastewater or sludge treating plant. Ponds and cells provided with aerating means are used for eliminating carbonaceous, nitrogenous, and phosphate pollutants. The invention is characterized in that an automaton uses periods during which the plant is underloaded to impose on it abnormal operating conditions. The automaton analyses the response of the plant to the abnormal operating conditions to simulate and optimize the plant operating parameters for heavy-load periods, by automatically adjusting the parameters of the automaton logic.

6 Claims, No Drawings

SELF-ADAPTIVE METHOD FOR REGULATING AN EFFLUENT TREATING PLANT, IN PARTICULAR FOR WASTE WATER

The present invention relates to a self-adjusting method for regulating effluent treatment plants, in particular for wastewater or sludge which results from this type of treatment. The invention can in particular be applied to such treatment plants in which elimination of various pollutants, in particular carbonaceous, nitrogenous or phosphate pollutants, is provided. It is known that these plants use treatment ponds or cells equipped with aerating means and that they generally comprise an aeration regulating system designed so as to make it possible to obtain pollutant elimination yields corresponding to the maximum which can be achieved by the capacity of the plant.

Examples of implementation of such systems of regulation are described in FR-A-2 724 646 and 2 765 210.

In these treatment plants, a physicochemical dephosphatation is carried out, for which use is made of reagents such as in particular ferric chloride, which leads to a modification of the values for the redox potential of the wastewater in the process of being treated. This type of interference is prejudicial to any system of regulation which takes into account the evolution of the redox potential for managing the aeration of the treatment ponds, as is the case of the systems described in the abovementioned publications. In this case, the thresholds of the original logic of the system of regulation are unsuitable for the treatment to eliminate the nitrogenous pollutants (nitrification and denitrification) and it is then necessary to readjust these values.

Specifically, the presence of a reagent for simultaneous physicochemical dephosphatation in the aerated sludge of wastewater treatment plants leads to a modification of the redox equilibria. These reagents are powerful oxidants and their addition to the sludge (for example in the form of ferric chloride or of aluminum salts) engenders an increase in the redox values obtained, which is variable depending on the amount of reagents injected into the sludge. In addition, it appears, in practice, that the redox values increase in a manner which is difficult to assess, depending on the reagent used and the operating conditions of the plant (for example modification of the load or of the rate of treatment, breakdown of the reagent metering pump). Such a sensitivity to the changing of the operating conditions while running requires regular adjustment of the thresholds of the logic of the system of regulation. The generalization of wastewater dephosphatation treatment, required by the national and European regulations, leads to the repeated occurrence of this type of problem in existing purification plants, and the present invention has set itself the objective of providing a solution thereto.

With this aim, it appeared, to the present proprietor, that, initially, it was necessary to link the reference redox values to operating parameters able to be measured on site, and to define new threshold values as a function of the running conditions associated, for example, with the simultaneous physicochemical dephosphatation. Next, it appeared desirable to develop an automated logic making it possible to vary the predefined redox thresholds in the logic of the system of regulation, in order to be free of manual interventions for re-setting the parameters of the thresholds of the logic for managing the treatment plant (in particular the aeration) for any modification of the running conditions. It must be possible for this self-adjustment of the redox thresholds by the automated regulating device to take place whatever the type of reagent used and whatever the plant operating conditions. This should make it possible to ensure the efficiency of the treatment of the nitrogenous pollutants (nitrification and denitrification) in a long-lasting manner whatever the running context.

Another constraint which has had to be taken into account in the invention is that of avoiding the further addition of material to the treatment plant, in order to be able to use the method which is the subject of the invention on systems of regulation implemented in accordance with the prior technique mentioned above.

Consequently, the present invention relates to a method for regulating an effluent treatment plant, in particular for wastewater or sludge which results from this type of treatment, using in particular ponds or cells equipped with aerating means, especially for eliminating carbonaceous, nitrogenous and phosphate pollutants, and an automated regulating device operating on analysis of the changing of predetermined operating parameters of the plant, this method being characterized in that:

the automated device uses periods during which the plant is underloaded to impose on it abnormal operating conditions, and the automated device analyzes the response of the plant to these abnormal operating conditions so as to update and optimize the plant operating parameters for heavy-load periods, by automatically adjusting the parameter set-up of the automated device logic.

Thus, the method which is the subject of the invention provides a readjustment of the threshold values of the reference redox potential which are used in the automated regulating device according to the prior technique specified above, so as to maintain guaranteed results for treatment of the carbonaceous and nitrogenous pollutants in the presence of simultaneous physicochemical dephosphatation. The operating of this logic enables the automated device to automatically adapt to all running conditions.

Thus, according to the invention, the maximum oxidation level attained by the sludge in the aeration pond is determined in order to automatically adjust the predefined thresholds in the logic of the automated regulating device.

According to one embodiment of the invention:

the values of the redox potential are recorded during an aeration forcing period, this period corresponding to a period during which the plant is underloaded;

the maximum level of the redox potential, and also the stabilizing thereof resulting in the presence of a redox plateau, are detected;

the value of this redox plateau is measured and is stored;

the operation is recommenced over a given period of time, for example of the order of one week;

the mean of the redox plateau over the periods in which the latter is measured is calculated, and said mean is used to obtain an updating of the redox potential thresholds, by comparison with the redox potential thresholds of origin, the automated device then operating using these new thresholds.

A detailed description will now be given of an embodiment of the method which is the subject of the invention, used for a treatment plant comprising physicochemical dephosphatation simultaneously with treatments to eliminate carbonaceous and nitrogenous pollutants. Thus, as will be explained below, this is merely a nonlimiting example of implementation, the method according to the invention being capable of being put to other uses.

The conditions for forcing aeration during a period in which the wastewater treatment plant is underloaded, the conditions for recording the forcing value, the conditions for calculating the mean of the values thus obtained, the comparison between the mean thus calculated and the original redox thresholds, and the permitted shifting of the redox thresholds of the logic of the automated regulating device have been described below.

Conditions for Forcing and Stopping the Aeration

The aim of forcing the aeration is to cause the redox to evolve at high values and to detect a stabilizing thereof during the nighttime period, characteristic of underloaded periods.

In this example of implementation of the method of the invention, the forcing of the aeration corresponds to the running, for a maximum period of 2 hours, of all the available aeration means during the nighttime period between 2 a.m. and 8 a.m. The beginning of the forcing should correspond to the first start-up on a regulating cycle between 2 a.m. and 8 a.m., maximum aeration is then demanded. There can be only one single forcing during the period considered.

The maximum aeration time permitted here will be 2 hours. If after 2 hours the redox has not stabilized, the aeration will stop automatically. The stopping of the aeration after the forcing will correspond to the system of regulation being re-operated, i.e. a maximum stop period of 2 hours.

In accordance with the method which is the subject of the invention, the forcing of the aeration should take place during periods of underloading. The nighttime slot of 2 a.m. to 8 a.m. chosen in the example of implementation described here is representative of the conditions associated with municipal wastewater. The period of forcing can be modifiable in precise contexts (in the case of regular nightly discharge), without, however, departing from the context of the invention.

Detection of a Redox Plateau During Forcing

The detection of what can suitably be called a redox plateau (defined below) will serve to determine the maximum level of oxidation of the sludge attained in the presence of the dephosphating reagent.

The redox value recorded for detecting the redox plateau will be the mean over one minute of the values examined by the automated device, in order to limit the effect of variation of the redox.

In this example of implementation, the stabilizing of the redox is controlled in the following way: during the maximum 2 hours of aeration, if the redox does not increase or does not decrease by more than 20 mV during a 15 min period, then the aeration stops. These conditions correspond to the appearance of a stabilization corresponding to what is referred to as the "redox plateau". The maximum value recorded during the 15 min of stabilization will be memorized and stored in the automated device. This value will correspond to the redox plateau of day D.

If it has not been possible to detect a redox plateau, then the forcing of the aeration will end after 2 hours. No forcing redox value will be memorized for that precise day.

Conditions for Calculating the Mean of the Redox Forcings

Calculation of the mean of the redox forcings will serve to absorb the possible fluctuations in these values, in such a way that action is taken in a time representative of the inertia of the system for mixing sludge and reagent.

A calculation of the mean of the redox forcing values recorded will be requested every 7 days, in this example of implementation. For this, conditions should be satisfied before allowing the automated device to average the values.

These conditions concern essentially the number of values:

if the number of forcing values recorded (plateaus reached) over the 7 days is greater than or equal to 4, then the mean of the values can be calculated;

conversely, if the number of forcing values is strictly less than 4, then the mean of the values has no meaning and should not be calculated. The mean will not be updated and will remain the same as the preceding week. This lack of new value for the mean will be recorded.

The mean forcing value for the week will be used for the comparison with the ongoing threshold values of the system of regulation, so as to determine their relevance in the updated running conditions.

If it has not been possible to calculate the weekly mean, this will indicate a considerable break in the measurement, which may be related to a problem of the redox electrode, consecutive unusual nighttime events, etc.

Use of the Weekly Mean for the Redox Forcings

The averaged value obtained will be compared to the ongoing upper threshold value 2 (see table below) in the logic of the system of regulation. The upper threshold 2 in fact corresponds to the maximum value which it is possible to attain when the oxidation of the sludge is satisfactory on the plant. This comparison will be used to determine the relevance of the thresholds used, and to modify them if this is proved to be necessary. This comparison, which is used to update the thresholds, will be carried out, for example, once a week.

The weekly averaged value will be used in the following way:

If present upper threshold 2—averaged value >+25 mV, then all the redox thresholds of the logic of the system of regulation are decreased by a level.

If present upper threshold 2—averaged value <−25 mV, then all the redox thresholds of the logic of the system of regulation are increased by a level.

If present upper threshold 2—averaged value <+25 mV and >−25 mV, then no action is requested and the system of regulation continues to operate with the thresholds preceding this calculation.

These comparative tests will make it possible to determine the difference existing between the values of the thresholds of the logic of the system of regulation used and the current redox values. An updating of the thresholds will be requested if the calculated difference exceeds 25 mV. If the difference is greater than +25 mV, then a decrease in the thresholds is requested; conversely, if the difference is greater than −25 mV, then an increase in the thresholds is necessary.

Request for Shift in the Thresholds of the Logic of the System of Regulation

The thresholds will change according to the criteria of a predefined table. This table will make it possible to cause the redox thresholds to change in steps of 25 mV for most of the thresholds of the system of regulation, where appropriate in steps of 50 mV for the lower threshold for reinitiation. The table below gives the shifting of the thresholds.

TABLE

Change in the redox thresholds of the logic of the system of regulation

| Level of shift | n − 3 | n − 2 | n − 1 | n | n + 1 | n + 2 | n + 3 |
|---|---|---|---|---|---|---|---|
| Shifts (mV/H2) for thresholds 1-2-3 | | +25 mV | +25 mV | +25 mV | +25 mV | +25 mV | +25 mV |
| Threshold 2 | 450 | 475 | 500 | 525 | 550 | 575 | 600 |
| | 400 | 425 | 450 | 475 | 500 | 525 | 550 |
| Threshold 1 | 350 | 375 | 400 | 425 | 450 | 475 | 500 |
| | 300 | 325 | 350 | 375 | 400 | 425 | 450 |
| Threshold 3 | 200 | 225 | 250 | 275 | 300 | 325 | 350 |
| Lower threshold | 100 | 150 | 200 | 225 | 250 | 275 | 300 |
| Lower threshold shift | | +50 mV | +50 mV | +25 mV | +25 mV | +25 mV | +25 mV |

This table indicates a shifting of the redox thresholds in steps of 25 mV for thresholds 1, 2 and 3 and, for most cases, for the lower threshold of the logic of the system of regulation. A single shift step is permitted after each calculation of the weekly mean. These steps correspond to a slow evolution of the system and indicate a change, which is in spite of everything significant, in the redox equilibrium within the activated sludge of the plant.

The permitted threshold changes are limited to a maximum of 600 mV, corresponding to very high redox measurements rarely attained on purification plants. Beyond this threshold, no increase is permitted and an alarm informs that this threshold has been exceeded. In the low values, the redox thresholds are limited by the original thresholds of the logic of the system of regulation (level n-3). This makes it possible to deal with a stopping of the injection of dephosphating reagent, taking into account the inertia of the system. In fact, approximately one to three months are necessary for the complete disappearance of dephosphating reagent in the sludge (inertia relating to more than three generations of sludge). The decrease in steps of 25 mV will thus make it possible to gradually attain the thresholds of the logic of the system of regulation. This minimum threshold corresponding to the threshold of the logic of the system of regulation makes it possible to manage the disappearance of dephosphating reagent and to continue to control the aeration on known bases, without putting the automated regulating device on the wrong track.

A product such as the dephosphating reagents acts as a strong oxidant on the redox electrode. This effect is especially predominant at the low redox values corresponding to the recommencement of aeration. For this, a further increase in the redox threshold for reinitiation, compared to the other thresholds, is necessary in order to limit the aeration stop times. The lower threshold was defined at 225 mV for the reference shift level n. Since an even step of 25 mV cannot include all the shifts, a step of 50 mV was defined between the thresholds 2 of 400–450 mV, in order to be able to attain the lower threshold corresponding to the threshold predefined in the logic of the system of regulation.

In order to facilitate the bringing into service and the assessment which may ensue therefrom, the shift n represented in bold in the table above will correspond to the redox values at the time of the initialization of the logic. In fact, the sites encountered until now, with conditions of simultaneous physicochemical dephosphatation, were operating with maximum redox values of approximately 500 mV/H2 in a period of aeration. This makes it possible to attain the limits of the redox thresholds established in the shift table, within a maximum period of three weeks.

For practical reasons relating to the writing of the program, the values listed in the table above will be theoretical values. In fact, all the threshold values of the logic of the system of regulation ending in other than 0 or 5 will be accepted. The programing of upper threshold 2 and lower threshold 2 will lead to the automatic updating of the other thresholds of this logic. In this way, it will be possible to have all units between 0 and 5, but always with a constant differential between the various thresholds corresponding to said logic.

Initialization of the Parameters

Before the automated device is brought into service, it is necessary to set up the parameters for the initialization values. The main initialization values concern the redox thresholds of the logic of the system of regulation at the start-up of the program. These thresholds should be at the level n described in the table above.

| | |
|---|---|
| Threshold 2 mV/H2 | 525 |
| | 475 |
| Threshold 1 mV/H2 | 425 |
| | 375 |
| Threshold 3 mV/H2 | 275 |
| Lower threshold mV/H2 | 225 |

The intermediate level of these thresholds in the shift number makes it possible to start up the automated device under any initial redox conditions. In addition, this level corresponds to the thresholds commonly encountered on physicochemical dephosphatation sites. One week is sufficient for the automated device to place itself at 25 mV greater or lesser, and three weeks are necessary to attain the limits imposed.

The example of implementation above related to the adjusting of the predefined thresholds in the logic of the automated regulating device in the case of sites with simultaneous physicochemical dephosphatation. In this adjustment, the automated device uses periods in which the plant is underloaded to impose on it abnormal operating conditions (here, the automated device forces the aeration during a period of the day when this is not necessary). The automated device analyzes the response of the plant to these abnormal operating conditions in order to adjust its operating parameters. It will thus have a perfect parameter set-up to get the best out of the plant during heavy-load periods.

Thus, according to the method which is the subject of the invention, the automated device uses periods during which the plant is underloaded to adjust its parameter set-up with a view to heavy-load periods.

The idea which forms the basis of the present invention therefore consists in using a reactor or a machine, in a period of underloading, to optimize the parameters thereof for periods of overloading. In the example of implementation described above, it was used to control the aeration of a purification plant. Other uses are possible without, however, departing from the context of the invention. Some examples thereof will be given below.

Control of the aeration of plants which are underloaded or which have a variable load: in these two running types, the operating of systems of regulation using redox potential thresholds can pose problems. These thresholds are characteristic of a state of the plant for a given load. If this load changes, the values of the thresholds must be adjusted. Similarly, thresholds programmed for a usual load must be modified when automatic action is installed on a plant with a very low load. The device used above automatically performs this adjustment of the redox thresholds of the automatic action.

Optimization of flocculant metering in sludge treatment: this is, for example, the case of units where a thickening screen is coupled to a band filter. The mass flux of sludge to be treated can be limited for a few moments, while at the same time varying the flow rate of flocculant and measuring the flow rate of water drained by the thickening screen. It is thus possible to adjust (taking into account the quality of the sludge to be treated) the flow rate of flocculant compared to the flow rate of water drained by the thickening screen. During this operation, the screen does not operate optimally. This deficiency must be compensated by the band filter, and this is entirely possible given the limitation of the mass load to be treated in this phase.

Methods are, moreover, known for measuring the total amount of sludge contained in a biological treatment plant for wastewater. In this regard, reference may be made to FR-A-2 769 305. This technique can be applied to plants in which the level of load is sufficiently low to produce an effluent whose quality is compatible with the European regulations. For these levels of load, normal running of the plant automatically implies that the mass of biomass contained in the treatment plant clarifier is negligible during a period of hydraulic underload (usually at night). This condition is necessary and sufficient for it to be possible to use this method of measuring the total mass of sludge contained in a plant.

The present invention makes it possible to extend the field of application of the method of measuring the total mass of sludge contained in a plant in accordance with the French publication mentioned above FR-A2 769 305.

When, even during a period of hydraulic underload, the mass of biomass contained in the clarifier is not negligible, the present invention can be used, imposing maximum values for the recirculation flow rate. This behavior, unusual among those skilled in the art, will bring about emptying of the clarifier and will make it possible to measure the total mass of sludge contained in the plant.

The aeration ponds in purification plants are usually stirred. The aim of this stirring is to homogenize the concentration of the materials in these ponds. Those skilled in the art therefore, as far as possible, keep this stirring system functioning. It is, in addition, necessary (see FR-A-2 784 093), in a system of automation, to measure the ability of the sludge to settle out. This measurement is performed using a manual test of settling out in a test tube. The present invention makes it possible to avoid this manual measurement.

It is necessary, for this, to stop the device during a period of nonaeration, for a given limited amount of time (for example one hour), and then to monitor the concentration of the materials in suspension at a given depth of the pond (for example 50 centimeters). Analysis of this curve gives those skilled in the art a measure of the ability of the sludge to settle out. In order to avoid any incorrect operation of the plant, it is necessary to carry out the stopping of the stirring during periods when the treatment unit is underloaded.

It remains, of course, that the present invention is not limited to the examples of implementation and/or of use described and represented above, but that it encompasses all the variants thereof.

What is claimed is:

1. A method for regulating an effluent treatment plant, in particular for wastewater or sludge which results from this type of treatment, using in particular ponds or cells equipped with aerating means, especially for eliminating carbonaceous, nitrogenous and phosphate pollutants, and an automated regulating device operating on analysis of the changing of predetermined operating parameters of the plant, characterized in that:

the automated device uses periods during which the plant is underloaded to impose on it abnormal operating conditions, and the automated device analyzes the response of the plant to these abnormal operating conditions so as to update and optimize the plant operating parameters for heavy-load periods, by automatically adjusting the parameter set-up of the automated device logic.

2. The method as claimed in claim 1, used in particular for the simultaneous treatment of carbonaceous, nitrogenous and phosphate pollutants, characterized in that the automated device forces the aeration during a period in which the plant is underloaded, and it analyzes the response of the plant to these abnormal operating conditions in order to adjust the plant operating parameters, optimizing them for periods of overload.

3. The method as claimed in claim 2, characterized in that:

the values of the redox potential are recorded during an aeration forcing period, this period corresponding to a period during which the plant is underloaded;

the maximum level of the redox potential, and also the stabilizing thereof resulting in the presence of a redox plateau, are detected;

the value of this redox plateau is measured and is stored;

the operation is recommenced over a given period of time, for example of the order of one week;

the mean of the redox plateau over the periods in which the latter is measured is calculated, and said mean of the redox plateau is used to obtain an updating of the redox potential thresholds, by comparison with the redox potential thresholds of origin, the automated device then operating using these new thresholds.

4. The method as claimed in claim 1, used for flocculant metering in sludge treatment, in particular on units using a thickening screen coupled to a band filter, characterized in that:

the mass flux of sludge to be treated is limited for a given period of time, while at the same time varying the flow rate of flocculent;

the flow rate of water drained by the thickening screen is measured; and the flow rate of flocculant is adjusted compared to the flow rate of water drained by the thickening screen.

5. The method as claimed in claim 1, used for measuring the total mass of sludge contained in a biological purification plant, characterized in that, during a period of hydraulic underload, maximum values for the sludge recirculation flow rate are imposed, which brings about emptying of the plant's clarifier, and the total mass of sludge contained in the plant is measured.

6. The method as claimed in claim 1, used for measuring the ability of the sludge to settle out in a purification plant comprising stirring of the aeration ponds in order to ensure homogenization of the concentration of the materials in suspension in the sludge, characterized in that:

the stirring is stopped during the periods of underload;

the change in concentration of the materials in suspension at a given depth of the aeration pond is monitored;

the curve obtained is analyzed, and the ability of the sludge to settle out is deduced therefrom.

* * * * *